(12) United States Patent
Fukui et al.

(10) Patent No.: US 12,123,759 B2
(45) Date of Patent: Oct. 22, 2024

(54) ULTRASONIC FLOWMETER

(71) Applicant: Panasonic Intellectual Property Management Co., Ltd., Osaka (JP)

(72) Inventors: Hiroto Fukui, Nara (JP); Masaki Sugiyama, Kyoto (JP); Naoto Naganuma, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 315 days.

(21) Appl. No.: 17/641,248

(22) PCT Filed: Nov. 10, 2020

(86) PCT No.: PCT/JP2020/041835
§ 371 (c)(1),
(2) Date: Mar. 8, 2022

(87) PCT Pub. No.: WO2021/100539
PCT Pub. Date: May 27, 2021

(65) Prior Publication Data
US 2022/0333965 A1    Oct. 20, 2022

(30) Foreign Application Priority Data
Nov. 19, 2019  (JP) ................. 2019-208656

(51) Int. Cl.
*G01F 1/00*        (2022.01)
*G01F 1/667*     (2022.01)
(52) U.S. Cl.
CPC .................... *G01F 1/667* (2013.01)
(58) Field of Classification Search
CPC .................................................... G01F 1/667
See application file for complete search history.

(56) References Cited

U.S. PATENT DOCUMENTS

2006/0201259 A1    9/2006   Umekage et al.
2007/0193367 A1    8/2007   Umekage et al.

FOREIGN PATENT DOCUMENTS

| JP | 2003-185477 | 7/2003 |
|---|---|---|
| JP | 2004-212180 | 7/2004 |

(Continued)

OTHER PUBLICATIONS

International Search Report of PCT application No. PCT/JP2020/041835 dated Jan. 26, 2021.

(Continued)

*Primary Examiner* — Jamel E Williams
(74) *Attorney, Agent, or Firm* — Wenderoth, Lind & Ponack, L.L.P.

(57) ABSTRACT

Ultrasonic flowmeter includes fluid flow path through which a measurement target fluid flows and a pair of ultrasonic transducers that can transmit and receive an ultrasonic signal. The ultrasonic flowmeter further includes flow rate calculator that calculates a flow velocity or flow rate of a measurement target fluid. In addition, fluid flow path includes a main flow path including a plurality of divided flow paths obtained by dividing a flow path having a rectangular cross-section by the same width, and a sub flow path including an added flow path having the same width as that of the divided flow path and having a height lower than that of the divided flow path. Furthermore, flow rate calculator calculates the flow rate of the measurement target fluid flowing through the fluid flow path from the flow velocity or flow rate of the measurement target fluid obtained based on the propagation time.

7 Claims, 18 Drawing Sheets

(56) References Cited

FOREIGN PATENT DOCUMENTS

| JP | 2004-279224 | 10/2004 | | |
|---|---|---|---|---|
| JP | 2014-215060 | 11/2014 | | |
| JP | 6229144 B2 * | 11/2017 | ............... | G01F 1/66 |
| WO | 2013/051272 | 4/2013 | | |
| WO | WO-2013051272 A1 * | 4/2013 | ............. | G01F 1/662 |

OTHER PUBLICATIONS

Extended European Search Report dated Nov. 15, 2022 for the related European Patent Application No. 20888902.2.

* cited by examiner

ULTRASONIC FLOWMETER

TECHNICAL FIELD

The present disclosure relates to an ultrasonic flowmeter that divides a measurement flow path into multilayer flow paths by partition plates to measure the flow rate of a measurement target fluid.

BACKGROUND ART

As a conventional ultrasonic flowmeter of this type, for example, an ultrasonic flowmeter of PTL 1 is known. FIGS. 13A to 13E are diagrams illustrating a conventional ultrasonic flowmeter disclosed in PTL 1. FIG. 13A is a perspective view of the conventional ultrasonic flowmeter. FIG. 13B is a view taken in the direction of arrow S in FIG. 13A. FIG. 13C is a view taken in the direction of arrow T in FIG. 13A. FIG. 13D is a cross sectional view taken along line 13D-13D of FIG. 13A. FIG. 13E is a cross sectional view taken along line 13E-13E of FIG. 13A.

As illustrated in FIGS. 13A to 13E, particularly FIG. 13E, the ultrasonic flowmeter is disposed in measurement flow path 4 having a rectangular cross-section in which a pair of ultrasonic transducers respectively including first ultrasonic transducer 6 and second ultrasonic transducer 7 are disposed. Entrainment flow suppression sheet 8 having opening portions 9, 10 smaller than the openings of recessed portions 11, 12 is disposed in a path extending from the ultrasonic transmission surfaces of first ultrasonic transducer 6 and second ultrasonic transducer 7 to measurement flow path 4. Suppression sheet 8 can suppress attenuation of ultrasonic waves, suppress generation of vortex flows p and q in recessed portions 11, 12, which cause a measurement error, and secure the measurement accuracy.

CITATION LIST

Patent Literature

PTL 1: Unexamined Japanese Patent Publication No. 2014-215060

SUMMARY OF THE INVENTION

Recently, there is an increasing demand for a gas meter incorporating an ultrasonic flowmeter for measuring a gas flow rate for general household use and for business use for, for example, large and small stores and other facilities. In response to this increasing demand, there is a need for an ultrasonic flowmeter having a flow path having a size corresponding to a gas flow rate to be measured.

For example, in the conventional ultrasonic flowmeter disclosed in PTL 1, the flow paths through which a measurement target fluid flows have substantially the same rectangular cross sectional shapes. That is, when the total number of flow paths including measurement flow path 4 is three, the three flow paths have cross sectional shapes with the same width and height. However, assume that in such a configuration, in order to measure a larger gas flow rate, the total number of flow paths is five by adding two flow paths. In this case, two flow paths having the same width and height as those of the existing flow paths are added. This poses a problem that an external size of the ultrasonic flowmeter is remarkably increased, and it is difficult to mount the ultrasonic flowmeter in a gas meter box housing the ultrasonic flowmeter. Note that the total number of measurement flow paths 4 shown in FIGS. 13B to 13D is four.

An ultrasonic flowmeter according to the present disclosure includes a fluid flow path through which a measurement target fluid flows, a pair of ultrasonic transducers disposed upstream and downstream of an upper portion of the fluid flow path and configured to transmit and receive an ultrasonic signal, and a flow rate calculator configured to calculate a flow rate of the measurement target fluid based on a propagation time from when the ultrasonic signal transmitted from one of the pair of ultrasonic transducers propagates through the measurement target fluid to when the other of the pair of ultrasonic transducers receives the ultrasonic signal. The fluid flow path includes a main flow path including a plurality of divided flow paths obtained by dividing a flow path having a rectangular cross-section by the same width, and a sub flow path including an added flow path having a cross-section having the same width as that of the divided flow path and having a height lower than that of the divided flow path. Furthermore, flow rate calculator calculates the flow rate of the measurement target fluid flowing through the fluid flow path from the flow velocity or flow rate of the measurement target fluid obtained based on the propagation time.

According to this configuration, since each rectangular added flow path of the sub flow path has the same width as the rectangular shape of each flow path of the measurement flow path and has a low height, the external size of the ultrasonic flowmeter can be made relatively compact, and highly accurate measurement can be implemented even for measurement of a measurement target fluid with a large flow rate.

According to the present disclosure, it is possible to provide an ultrasonic flowmeter that can implement highly accurate measurement while having a compact outer shape when measuring a measurement target fluid of a larger flow rate.

DESCRIPTION OF EMBODIMENTS

Hereinafter, exemplary embodiments of the present disclosure will be described in detail with reference to the accompanying drawings.

First Exemplary Embodiment (Configuration of Ultrasonic Flowmeter)

Figure 1A:
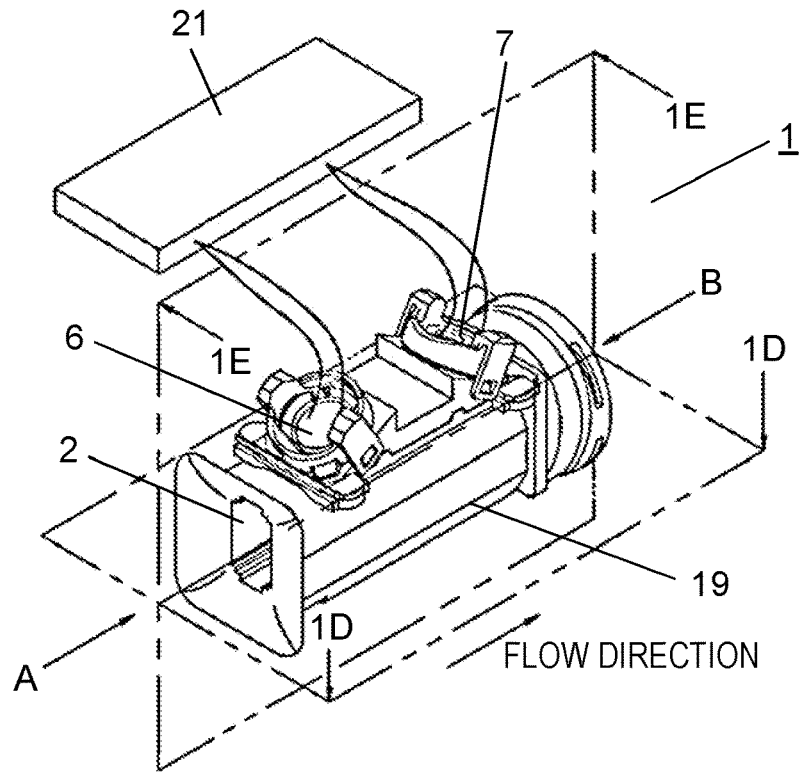
FIG. 1A is a perspective view of an ultrasonic flowmeter according to a first exemplary embodiment of the present disclosure.
Figure 1B:
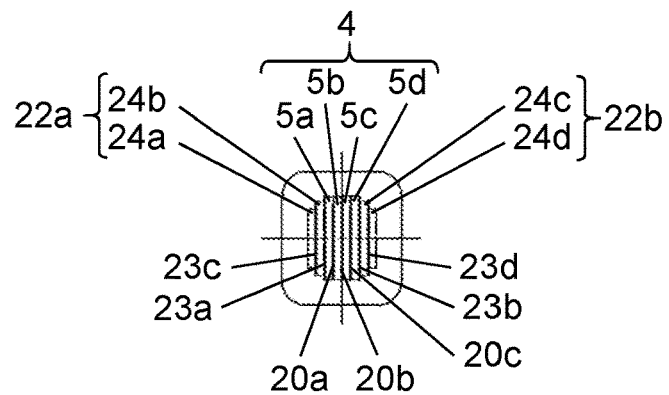
FIG. 1B is a view taken in the direction of arrow A of FIG. 1A.
Figure 1C:
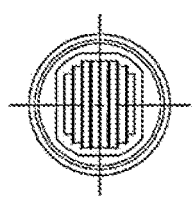
FIG. 1C is a view taken in the direction of arrow B of FIG. 1A.
Figure 1D:
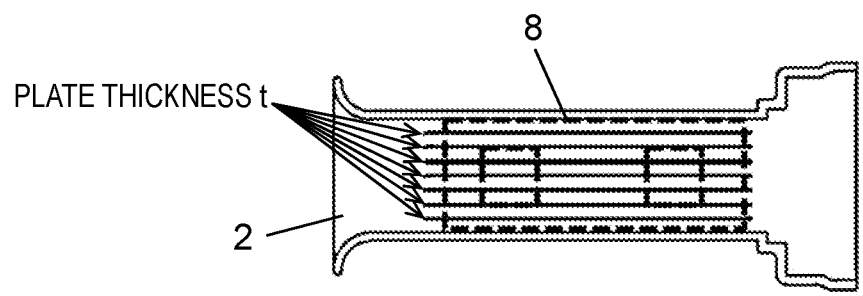
FIG. 1D is a cross sectional view taken along line 1D-1D of FIG. 1A.
Figure 1E:
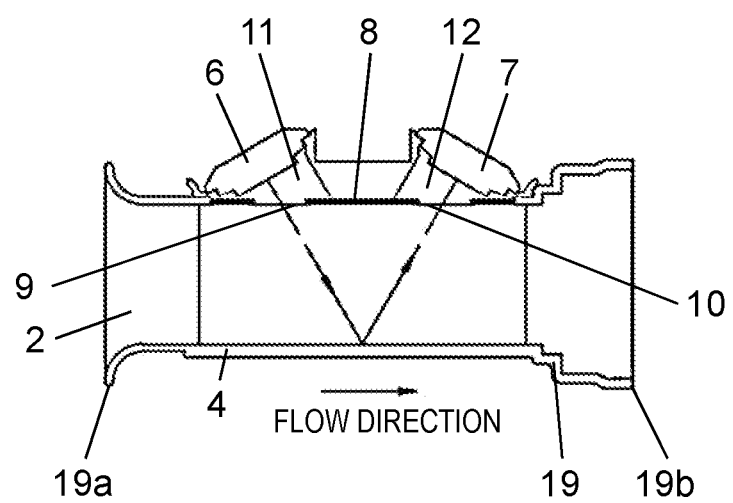
FIG. 1E is a cross sectional view taken along line 1E-1E of FIG. 1A.
Figure 2:
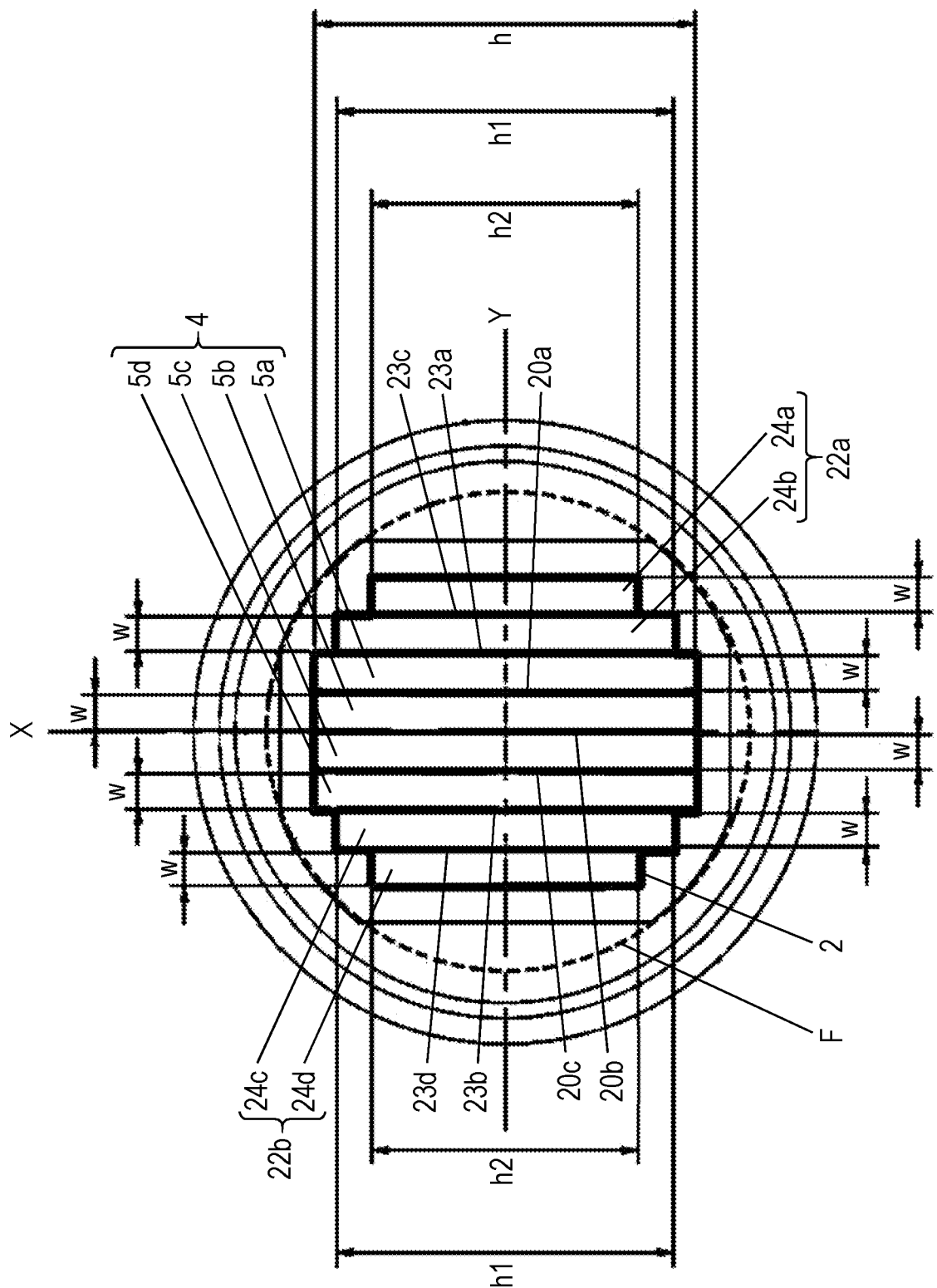
FIG. 2 is an enlarged view of FIG. 1C.

FIG. 1A is a perspective view of an ultrasonic flowmeter according to a first exemplary embodiment of the present disclosure. FIG. 1B is a view taken in a direction of arrow A in FIG. 1A. FIG. 1C is a view taken in the direction of arrow B in FIG. 1A. FIG. 1D is a cross sectional view taken along line 1D-1D of FIG. 1A. FIG. 1E is a cross sectional view taken along line 1E-1E of FIG. 1A. FIG. 2 is an enlarged view of FIG. 1C.

As illustrated in FIGS. 1A to 1E and 2, ultrasonic flowmeter 1 includes flow path body 19 in which fluid flow path 2 through which a measurement target fluid flows is configured. A pair of ultrasonic transducers including first ultrasonic transducer 6 and second ultrasonic transducer 7 that can transmit and receive ultrasonic signals are disposed upstream and downstream of an upper portion of fluid flow path 2. The ultrasonic flowmeter further includes flow rate calculator 21 that measures the flow velocity or flow rate of a fluid to be contacted based on the propagation time from when the ultrasonic signal transmitted from one of the pair of ultrasonic transducers including first ultrasonic transducer 6 and second ultrasonic transducer 7 propagates through a measurement target fluid to when the ultrasonic signal is received by the other ultrasonic transducer.

In fluid flow path 2, measurement flow path 4, which is a main flow path having a rectangular flow cross-section, is divided by partition plates 20a, 20b, and 20c and constitutes a plurality of divided flow paths 5a, 5b, 5c, and 5d having same width w and same height h. The fluid flow path 2 is provided with sub flow paths 22a, 22b constituted with added flow paths 24a, 24b, 24c, and 24d which have rectangular cross-sections having same width was that of divided flow paths 5a, 5b, 5c, and 5d constituting measurement flow path 4 and having height lower than height h of divided flow paths 5a, 5b, 5c, and 5d. Measurement flow path 4 as a main flow path and sub flow path 22a are divided by sub partition plate 23a, and measurement flow path 4 as a main flow path and sub flow path 22b are divided by sub partition plate 23b. Sub flow path 22a is provided with added flow paths 24a, 24b which are divided by sub partition plate 23c and have rectangular cross-sections which have the same width w as that of divided flow paths 5a, 5b, 5c, and 5d and having a height lower than height h of divided flow paths 5a, 5b, 5c, and 5d. Sub flow path 22b is provided with added flow paths 24c, 24d which are divided by sub partition plate 23d and have rectangular cross-sections which have the same width w as that of divided flow paths 5a, 5b, 5c, and 5d and having a height lower than height h of divided flow paths 5a, 5b, 5c, and 5d.

Flow path body 19 includes trumpet-shaped inlet portion 19a into which the measurement target fluid flows and outlet portion 19b from which the measurement target fluid flows out, and may have, for example, a structure made by resin injection molding. Partition plates 20a, 20b, and 20c and sub partition plates 23a, 23b, 23c, and 23d are made of, for example, stainless metal plates and have same plate thickness t, which is about 0.3 mm, as illustrated in FIG. 1D. Partition plates 20a, 20b, and 20c and sub partition plates 23a, 23b, 23c, and 23d are attached to flow path body 19.

Figure 3A:
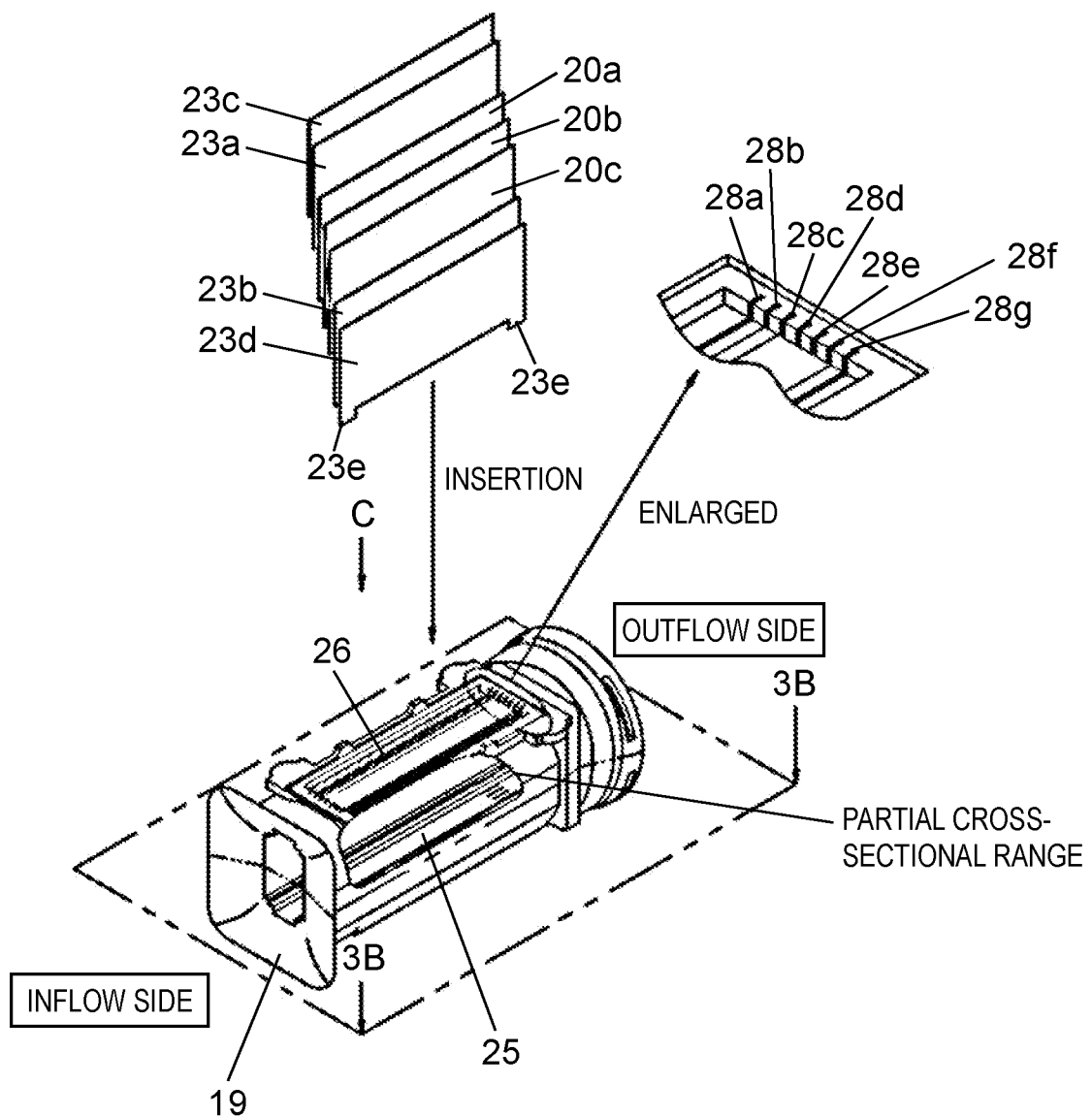
FIG. 3A is an exploded perspective view of a flow path body and each partition plate according to the first exemplary embodiment of the present disclosure.
Figure 3B:
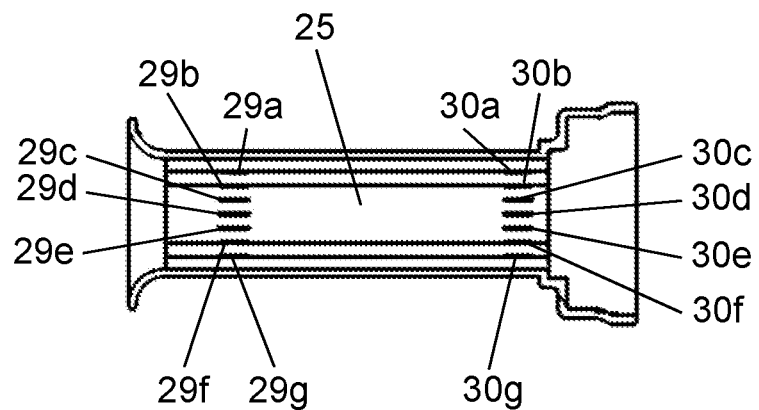
FIG. 3B is a cross sectional view taken along line 3B-3B of FIG. 3A.
Figure 3C:
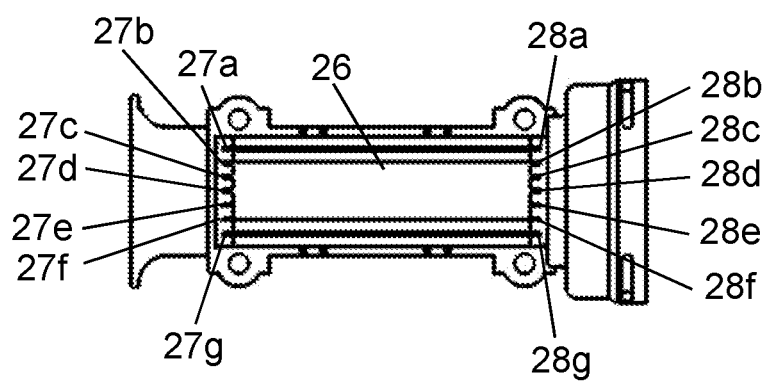
FIG. 3C is a view taken in the direction of arrow C of FIG. 3A.

FIG. 3A is an exploded perspective view of a flow path body and each partition plate according to the first exemplary embodiment of the present disclosure. FIG. 3B is a cross sectional view taken along line 3B-3B of FIG. 3A. FIG. 3C is a view taken in the direction of arrow C in FIG. 3A.

As illustrated in FIG. 3B, inflow-side fixing grooves 29a, 29b, 29c, 29d, 29e, 29f, and 29g and outflow-side fixing grooves 30a, 30b, 30c, 30d, 30e, 30f, and 30g are provided on the reflecting surface 25 side of a space through which the measurement target fluid flows. Reflecting surface 25 is a flat surface by which an ultrasonic signal transmitted from one of the pair of ultrasonic transducers including first ultrasonic transducer 6 and second ultrasonic transducer 7 is reflected to cause the ultrasonic signal to propagate through the measurement target fluid and reach the other ultrasonic transducer.

As shown in FIG. 3C, inflow-side slits 27a, 27b, 27c, 27d, 27e, 27f, and 27g and outflow-side slits 28a, 28b, 28c, 28d, 28e, 28f, and 28g are provided on entrainment flow suppression sheet installation surface 26 side of flow path body 19.

In this case, inflow-side fixing grooves 29a to 29g, outflow-side fixing grooves 30a to 30g, inflow-side slits 27a to 27g, and outflow-side slits 28a to 28g all have the same width and a thickness of, for example, about 0.32 mm, which is slightly larger than plate thicknesses t of partition plates 20a to 20c and sub partition plates 23a to 23d. Further, as for the shapes of partition plates 20a to 20c and the sub partition plates 23a to 23d, as indicated by the shape of sub partition plate 23d in FIG. 3A, two protruding portions 23e are provided.

In the structure as described above, when partition plates 20a to 20c and sub partition plates 23a to 23d are attached to flow path body 19, as illustrated in FIG. 3A, they are inserted from the entrainment flow suppression sheet installation surface 26 side. Protruding portions 23e of partition plates 20a to 20c and sub partition plates 23a to 23d are fitted into respective inflow-side fixing grooves 29a to 29g and respective outflow-side fixing grooves 30a to 30g, whereas the portions of the respective partition plates and the respective sub partition plates which are opposite to protruding portions 23e are sandwiched between inflow-side slits 27a to 27g and outflow-side slits 28a to 28g and fixed by clearance fit.

In this case, flow path body 19, partition plates 20a to 20c, and sub partition plates 23a to 23d are configured as separate parts and are fixed and integrated by clearance fit. However, for example, partition plates 20a to 20c, sub partition plates 23a to 23d, and flow path body 19 may be configured to be integrally molded with resin.

Figure 4:
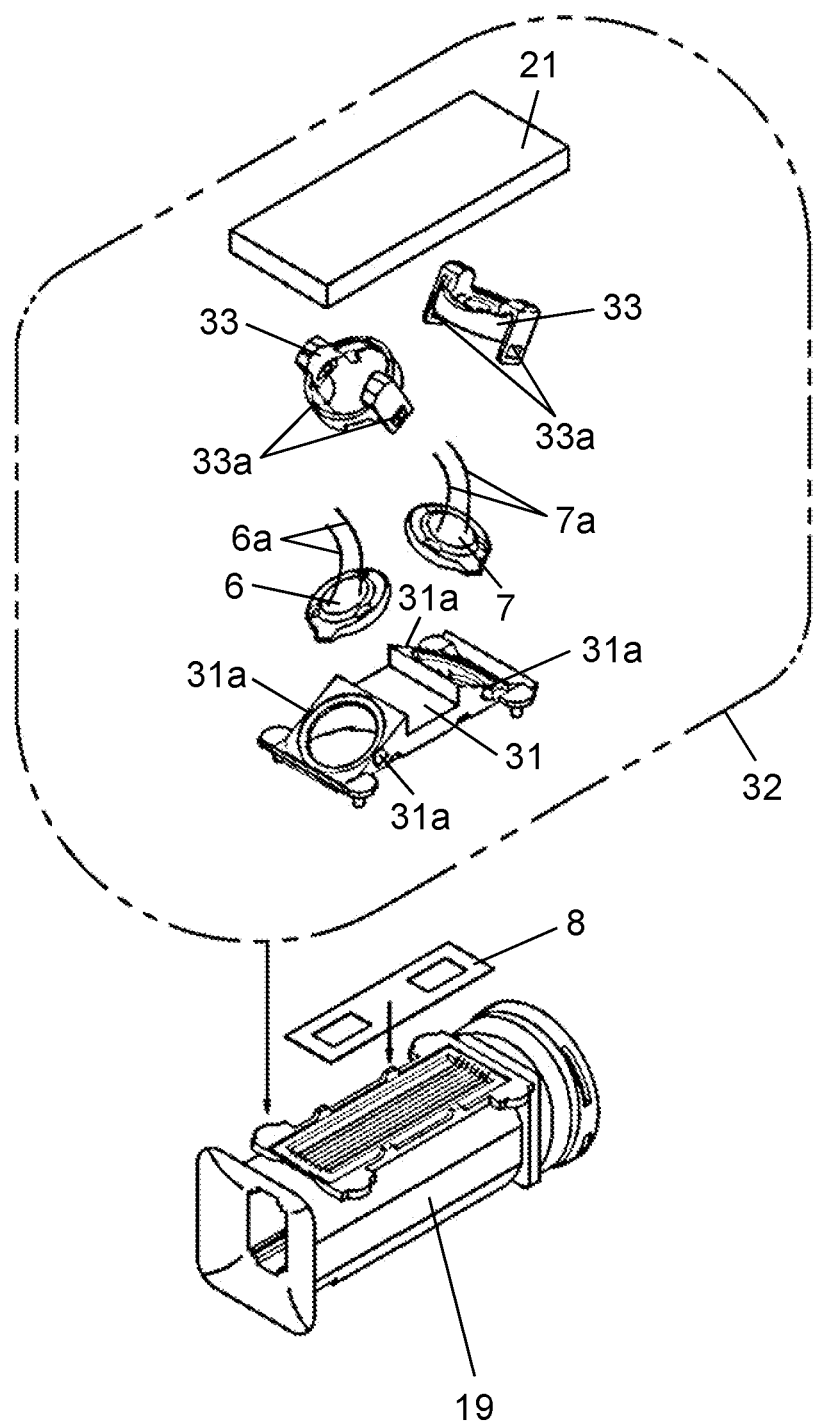
FIG. 4 is a perspective view of an ultrasonic flowmeter according to the first exemplary embodiment of the present disclosure.

FIG. 4 is a perspective view of ultrasonic flowmeter 1 according to the first exemplary embodiment of the present disclosure. As illustrated in FIG. 4, first ultrasonic transducer 6 and second ultrasonic transducer 7 are set at predetermined positions of resin ultrasonic transducer fixing body 31 and fixed by resin ultrasonic transducer fixtures 33. Projections 31a are provided on the ultrasonic transducer fixing body 31 side, and fitting holes 33a provided on the ultrasonic transducer fixture 33 side are fitted on the projections, thereby sandwiching and fixing first ultrasonic transducer 6 and second ultrasonic transducer 7 between ultrasonic transducer fixing body 31 and ultrasonic transducer fixtures 33. Signal lines 6a, 7a of first ultrasonic transducer 6 and second ultrasonic transducer 7 are connected to flow rate calculator 21.

Ultrasonic transducer unit 32 assembled in this manner is attached to an upper portion of flow path body 19 through entrainment flow suppression sheet 8. Ultrasonic transducer fixing body 31 can be attached to flow path body 19 by, for example, thermal welding as long as both the components are made of a resin.

As illustrated in FIG. 2, divided flow paths 5a, 5b, 5c, and 5d of measurement flow path 4 each have a rectangular cross sectional shape having width w and height h and are interposed between partition plates 20a, 20b, and 20c having same plate thickness t. Added flow path 24a of sub flow path 22a has a rectangular cross sectional shape with width w and height h2. Added flow path 24b has a rectangular cross sectional shape with width w and height h1. Added flow path 24a and added flow path 24b sandwich sub partition plate 23c having plate thickness t. Added flow path 24d of sub flow path 22b has a rectangular cross sectional shape with width w and height h2. Added flow path 24c has a rectangular cross sectional shape with width w and height h1.

In this case, with respect to the height, h2<h1<h is set so that the flow passage cross-section of fluid flow path 2 falls within circle F indicated by the dotted line. Added flow path 24d and added flow path 24c sandwich sub partition plate 23d having plate thickness t. Measurement flow path 4 and sub flow path 22a sandwich sub partition plate 23a having plate thickness t. Measurement flow path 4 and sub flow path 22b sandwich sub partition plate 23b having plate thickness t. Sub flow path 22a and sub flow path 22b are arranged so as to be symmetric with respect to widthwise center line X and heightwise center line Y of measurement flow path 4.

(Function and Effect of Ultrasonic Flowmeter)

The first function and effect of the ultrasonic flowmeter according to the first exemplary embodiment of the present disclosure will be described first.

Figure 5A:
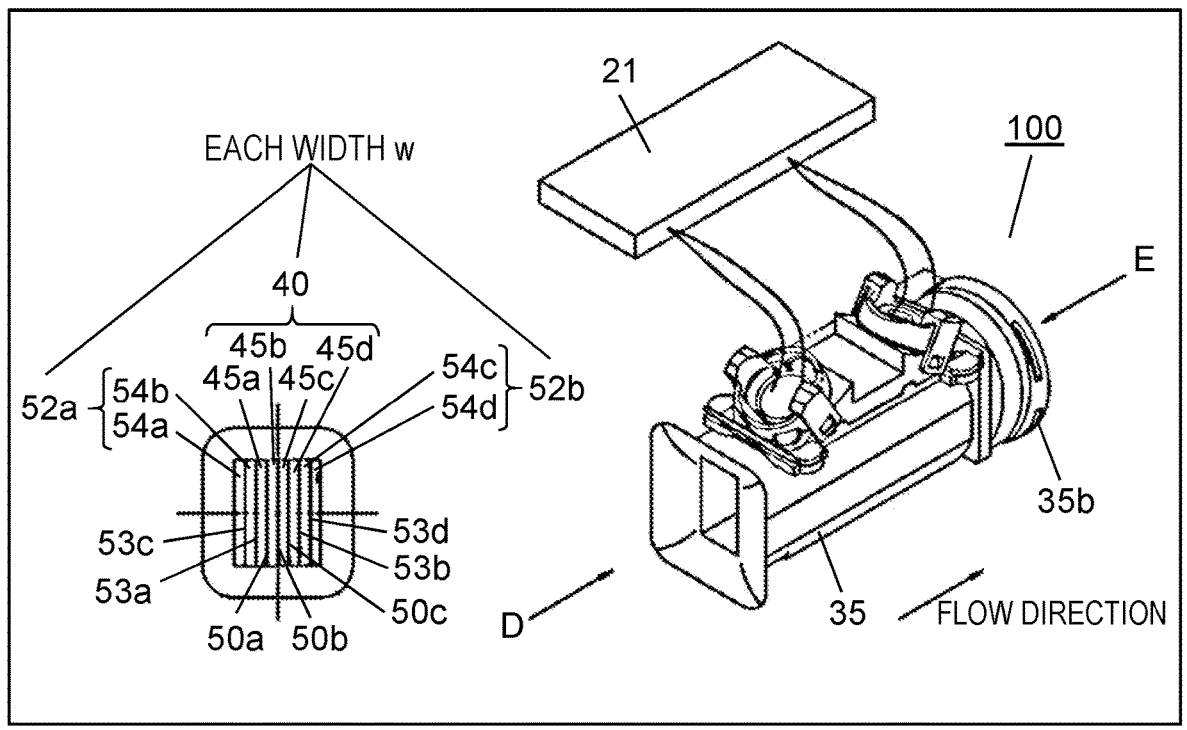
FIG. 5A is a flow path configuration diagram in a case in which a large flow rate can be measured in a conventional ultrasonic flowmeter.

FIG. 5A illustrates a flow path configuration diagram of ultrasonic flowmeter 100 using flow path body 35 to which a flow path is added to measure a larger gas flow rate in the conventional ultrasonic flowmeter according to PTL 1. An example of a fluid flow path is illustrated in which sub flow path 52a having two flow paths and sub flow path 52b having two sub flow paths are added to measurement flow path 40 having four flow paths, thus having a total of eight flow paths. In this case, the rectangular cross sectional shapes of flow paths 54a, 54b of added sub flow path 52a and flow paths 54c, 54d of added sub flow path 52b are configured to have same width w and same height h as those of flow paths 45a, 45b, 45c, and 45d of measurement flow path 4. That is, this corresponds to a case in which h=h1=h2 is set in the first exemplary embodiment.

Figure 5B:
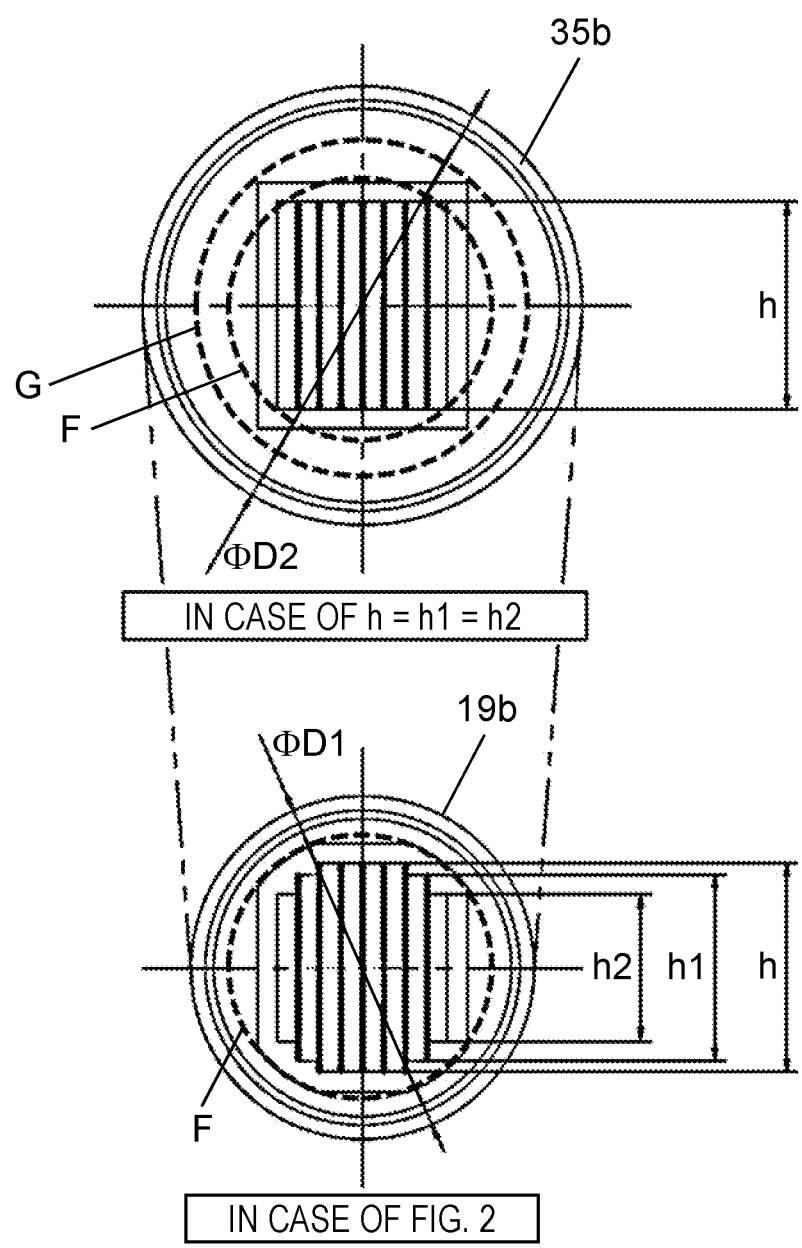
FIG. 5B is a comparative diagram of the conventional ultrasonic flowmeter and the ultrasonic flowmeter according to the first exemplary embodiment.

FIG. 5B is a comparison diagram between outlet portion 35b which is a view taken along arrow E of ultrasonic flowmeter 100 in which the outer diameter of outlet portion 35b is set to ΦD1 illustrated in FIG. 5A and outlet portion 19b, illustrated in FIGS. 1C and 2, which is a view taken along arrow B of ultrasonic flowmeter 1 in which the outer diameter of outlet portion 19b is set to ΦD1 according to the first exemplary embodiment illustrated in FIG. 1A. In ultrasonic flowmeter 1 according to the first exemplary embodiment, fluid flow path 2 falls within circle F indicated by the dotted line, whereas in ultrasonic flowmeter 100, fluid flow path 2 falls within circle G larger than circle F. Circle F and circle G correspond to the minimum diameter of flow path body 35 necessary for internally forming a fluid flow path. That is, as can be seen from FIG. 5B, ΦD1<ΦD2 is set, and according to ultrasonic flowmeter 1 according to the first exemplary embodiment of the present disclosure, a compact configuration can be implemented by arranging sub flow path 22a and sub flow path 22b in minimum circle F including measurement flow path 4.

The second function and effect of ultrasonic flowmeter 1 according to this exemplary embodiment will be described next.

As illustrated in FIG. 2, which is a view taken along arrow B in FIG. 1A, in ultrasonic flowmeter 1 according to the present exemplary embodiment, added sub flow path 22a and added sub flow path 22b are arranged so as to be vertically and horizontally symmetrical with respect to widthwise center line X and heightwise center line Y of measurement flow path 4, including same plate thickness t of partition plates 20a, 20b, and 20c and sub partition plates 23a, 23b, 23c, and 23d.

In ultrasonic flowmeter 1, the pair of ultrasonic transducers including first ultrasonic transducer 6 and second ultrasonic transducer 7 are disposed upstream and downstream of an upper portion of fluid flow path 2. The ultrasonic flowmeter computes the flow velocity or flow rate of a measurement target fluid based on the propagation time from when the ultrasonic signal transmitted from one of the pair of ultrasonic transducers propagates through the measurement target fluid to when the ultrasonic signal is received by the other ultrasonic transducer. Accordingly, since an ultrasonic signal propagates only to the measurement flow path, the flow velocity or flow rate of a measurement target fluid passing through added sub flow path 22a and added sub flow path 22b is not directly measured.

Accordingly, as for the flow rate of a measurement target fluid passing through measurement flow path 4, sub flow path 22a, and sub flow path 22b, the flow rate of the entire measurement target fluid including sub flow path 22a and sub flow path 22b is calculated from the measurement result obtained in measurement flow path 4 that directly measures the passing measurement target fluid.

For example, the flow rate can be calculated by multiplying the flow path cross-sectional area (the sum of the flow path cross-sectional areas of measurement flow path 4, sub flow path 22a, and sub flow path 22b) of fluid flow path 2 by the flow velocity of the measurement target fluid obtained in measurement flow path 4. The ratios between the flow rate of measurement flow path 4 and the flow rates of sub flow path 22a and sub flow path 22b may be obtained in advance. The flow rates of sub flow path 22a and sub flow path 22b may be calculated from the flow rate of measurement flow path 4 and added together. However, in any case, the flow velocities of measurement flow path 4, sub flow path 22a, and sub flow path 22b are preferably the same even when the flow rate changes.

Therefore, the flow velocity distribution of a measurement target fluid passing through measurement flow path 4, sub flow path 22a, and sub flow path 22b needs to be as uniform as possible. In the present exemplary embodiment, since sub flow path 22a and sub flow path 22b are vertically and horizontally symmetrical with respect to measurement flow path 4, a more uniform flow of the passing measurement target fluid can be implemented, and highly accurate measurement can be implemented.

Even if added sub flow path 22a and added sub flow path 22b are arranged vertically and horizontally symmetrically with respect to measurement flow path 4 and are also arranged within circle F of outlet portion 19b in the first exemplary embodiment described as "in the case illustrated in FIG. 2" in the lower part of FIG. 5B, the measurement result may not be preferable.

Figure 6A:
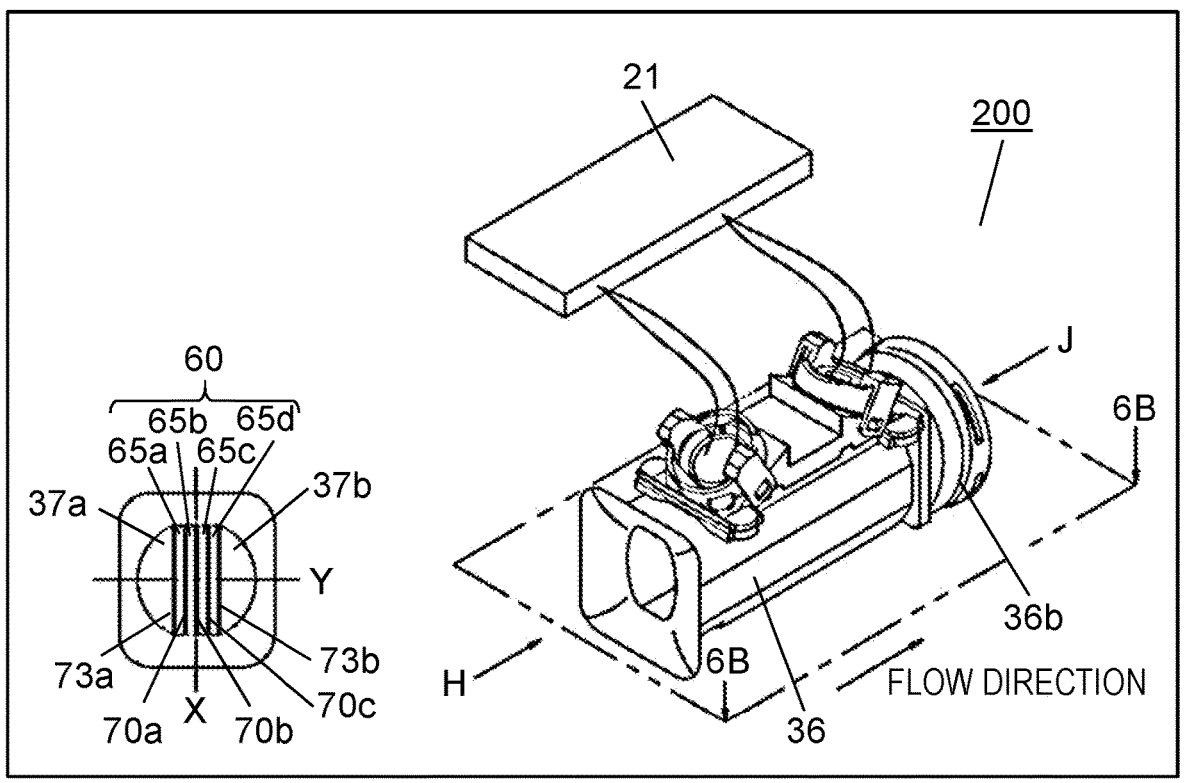
FIG. 6A is a flow path configuration diagram in a case in which a large flow rate can be measured by the conventional ultrasonic flowmeter.
Figure 6B:
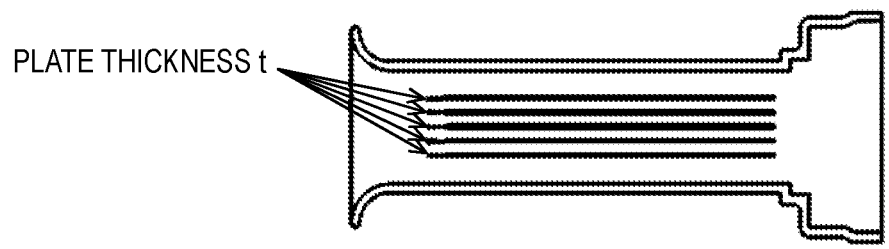
FIG. 6B is a cross sectional view taken along line 6B-6B of FIG. 6A.
Figure 6C:
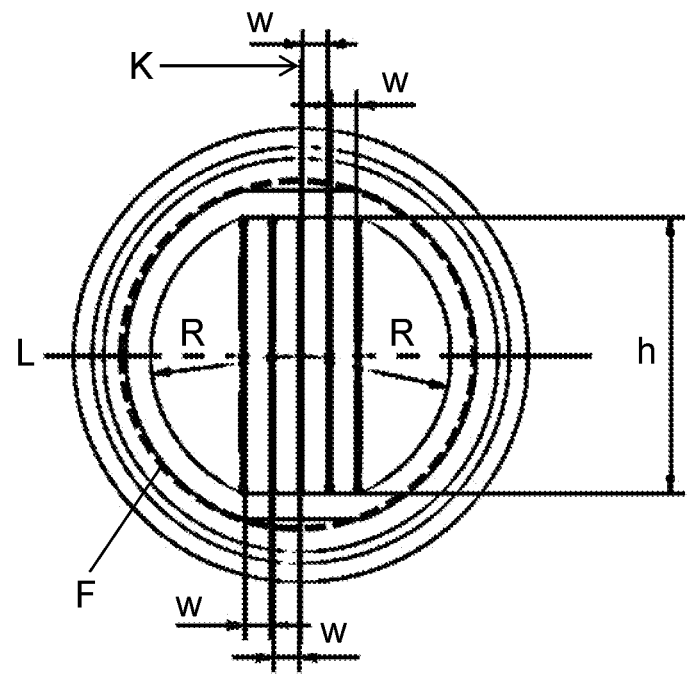
FIG. 6C is a view taken in the direction of arrow J of FIG. 6A.

FIGS. 6A to 6C illustrate ultrasonic flowmeter 200 as an example of the above case. FIG. 6A is a flow path configuration diagram in a case in which a large flow rate can be measured by the conventional ultrasonic flowmeter. FIG. 6B is a cross sectional view taken along line 6B-6B of FIG. 6A. FIG. 6C is a view taken in the direction of arrow J in FIG. 6A.

As illustrated in FIG. 6A, in ultrasonic flowmeter 200, sub flow path 37a and sub flow path 37b are arranged on the left and right of measurement flow path 60 so as to be vertically and horizontally symmetrical with respect to widthwise center line X and heightwise center line Y. However, the flow path cross-sectional shapes of sub flow path 37a and sub flow path 37b are substantially semicircular unlike the rectangles of divided flow paths 65a, 65b, 65c, and 65d of measurement flow path 60, and the flow path cross-sectional areas of sub flow path 37a and sub flow path 37b are about 2.6 times larger than those of divided flow paths 65a to 65d of measurement flow path 60.

Figure 7:
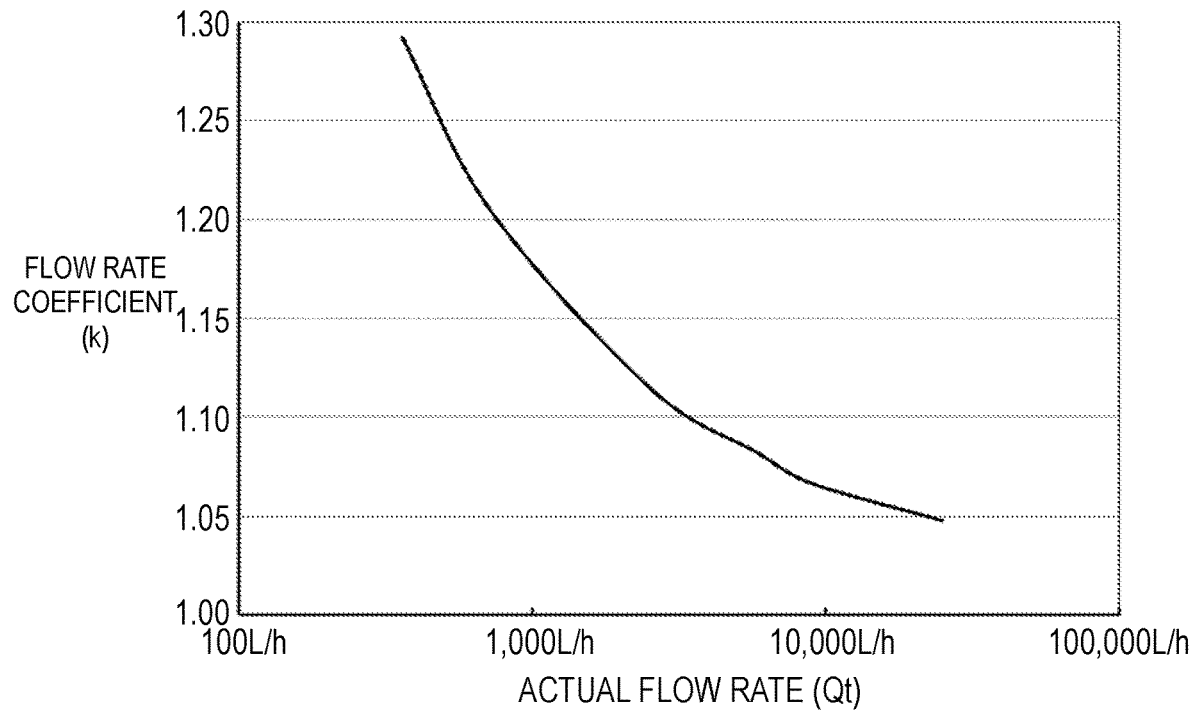
FIG. 7 is a graph illustrating the flow rate measurement result obtained by the ultrasonic flowmeter illustrated in FIGS. 6A to 6C.

FIG. 7 is a graph illustrating the flow rate measurement result obtained by ultrasonic flowmeter 200 illustrated in FIGS. 6A to 6C in the form of actual flow rates and flow rate coefficients. In this case, a flow rate coefficient (k) is a coefficient for computing an actual flow rate from a measured flow rate and is defined as k=Qt/Qm when the actual flow rate is Qt and the measured flow rate is Qm. Note that measurement flow rate Qm is calculated as the total flow rate by multiplying the sum of the flow path cross-sectional areas of measurement flow path 60, sub flow path 37a, and sub flow path 37b by the flow velocity obtained in measurement flow path 60.

Flow rate coefficient k is ideally 1 with respect to actual flow rate Qt on the horizontal axis. In this case, the flow rate coefficient indicates that actual flow rate Qt of the passing measurement target fluid coincides with the flow rate of the entire measurement target fluid, including sub flow path 37a and sub flow path 37b, which is calculated from the flow rate measured by measurement flow path 60. Therefore, it is ideal that flow rate coefficient k on the vertical axis changes in the vicinity of the value 1 with respect to actual flow rate Qt on the horizontal axis. This indicates that the measurement accuracy is high.

On the other hand, the result illustrated in FIG. 7 shows a transition in which flow rate coefficient k shows a value larger than 1 at the time of a small flow rate, and flow rate coefficient k gradually approaches 1 at the time of a large flow rate. This indicates that, at the time of a small flow rate, the flow rate of the entire measurement target fluid, including sub flow path 37a and sub flow path 37b, which is calculated from the flow rate actually measured in measurement flow path 60 is smaller than actual flow rate Qt, and hence the flow rate does not match actual flow rate Qt unless flow rate coefficient k larger than 1 is multiplied. This indicates that the measurement accuracy is low.

The reason is that since the flow path cross-sectional area of sub flow path 37a or sub flow path 37b is larger than that of divided flow paths 65a to 65d of measurement flow path 60, the fluid does not flow to the measurement flow path 60 side having a large flow path resistance at the time of a small flow rate but easily flows to the sub flow path 37a or sub flow path 37b side having a small flow path resistance, and the flow does not become uniform, resulting in the large velocity distribution of the measurement target fluid. In addition, at the time of a large flow rate, the measurement target fluid does not sufficiently flow only by the flow path cross-sectional area of sub flow path 37a or sub flow path 37b, and hence flows also to the measurement flow path 60 side and gradually changes to a uniform flow.

Even if sub flow path 37a and sub flow path 37b added in this way are arranged vertically and horizontally symmetrically with respect to measurement flow path 60, the measurement accuracy may not be preferable. It is important to make the flow velocity distribution of the measurement target fluid uniform as much as possible from the small flow rate region to the large flow rate region.

Figure 8:
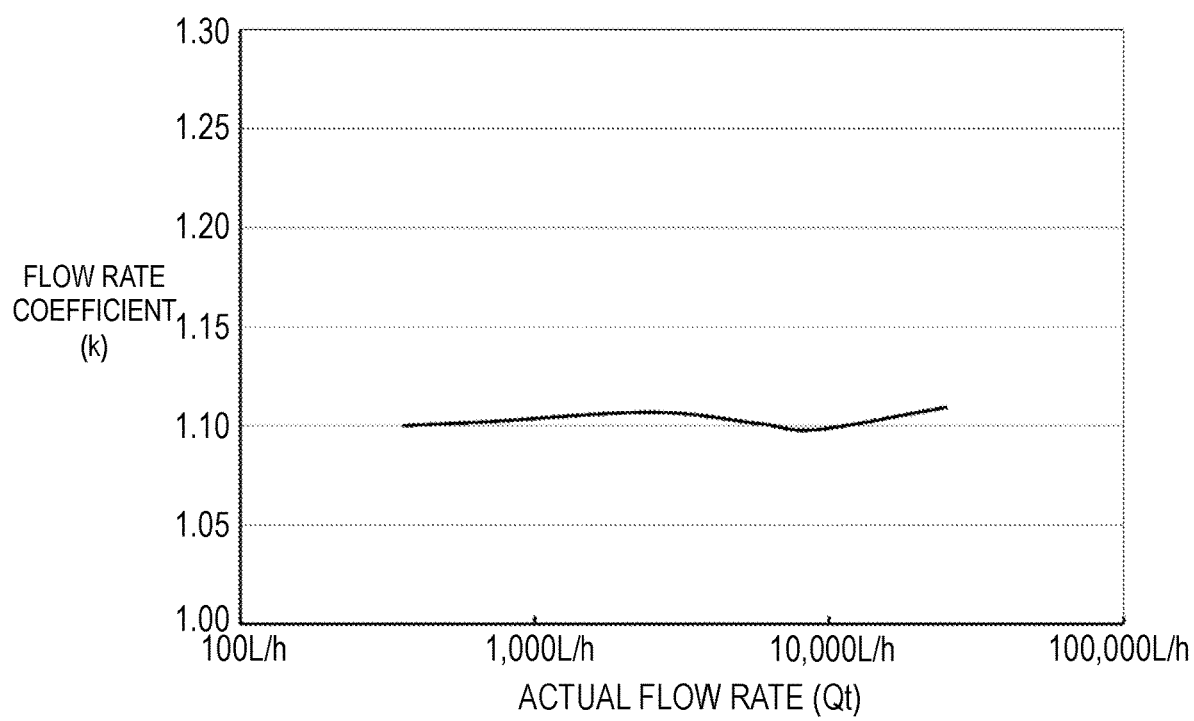
FIG. 8 is a graph illustrating the flow rate measurement result obtained by the ultrasonic flowmeter according to the first exemplary embodiment of the present disclosure.

In contrast to this, FIG. 8 illustrates the flow rate measurement result obtained by ultrasonic flowmeter 1 according to the first exemplary embodiment of the present disclosure illustrated in FIGS. 1A to 1E and 2. According to FIG. 8, flow rate coefficient k changes in the vicinity of 1.10 in the flow rate region from the small flow rate region to the large flow rate region, there is almost no change in flow rate coefficient as illustrated in FIG. 7, and the characteristic of the flow rate coefficient is flat and the measurement accuracy is high. This is because the flow path widths of added flow paths 24a, 24b of sub flow path 22a and added flow paths 24c, 24d of sub flow path 22b are set to same width w as the flow path widths of divided flow paths 5a, 5b, 5c, and 5d of measurement flow path 4, which is the main flow path, so that the difference in flow path resistance can be reduced.

As described above, according to the present exemplary embodiment, it is possible to provide an ultrasonic flowmeter that can implement highly accurate measurement while having a compact outer shape when measuring a measurement target fluid of a large flow rate.

(First Modification)

In ultrasonic flowmeter 1 according to the first exemplary embodiment of the present disclosure illustrated in FIGS. 1A to 1E and 2, as indicated by arrow B in FIG. 1A shown in a lower part of FIG. 5B, the flow path height of added flow path 24b of sub flow path 22a and added flow path 24c of sub flow path 22b is selected as h1 and the flow path height of added flow path 24a of sub flow path 22a and added flow path 24d of sub flow path 22b is selected as h2 so as to fall within circle F. However, when the flow path width is set to width w, even if the flow path height is changed, highly accurate measurement can be performed.

Figure 9A:
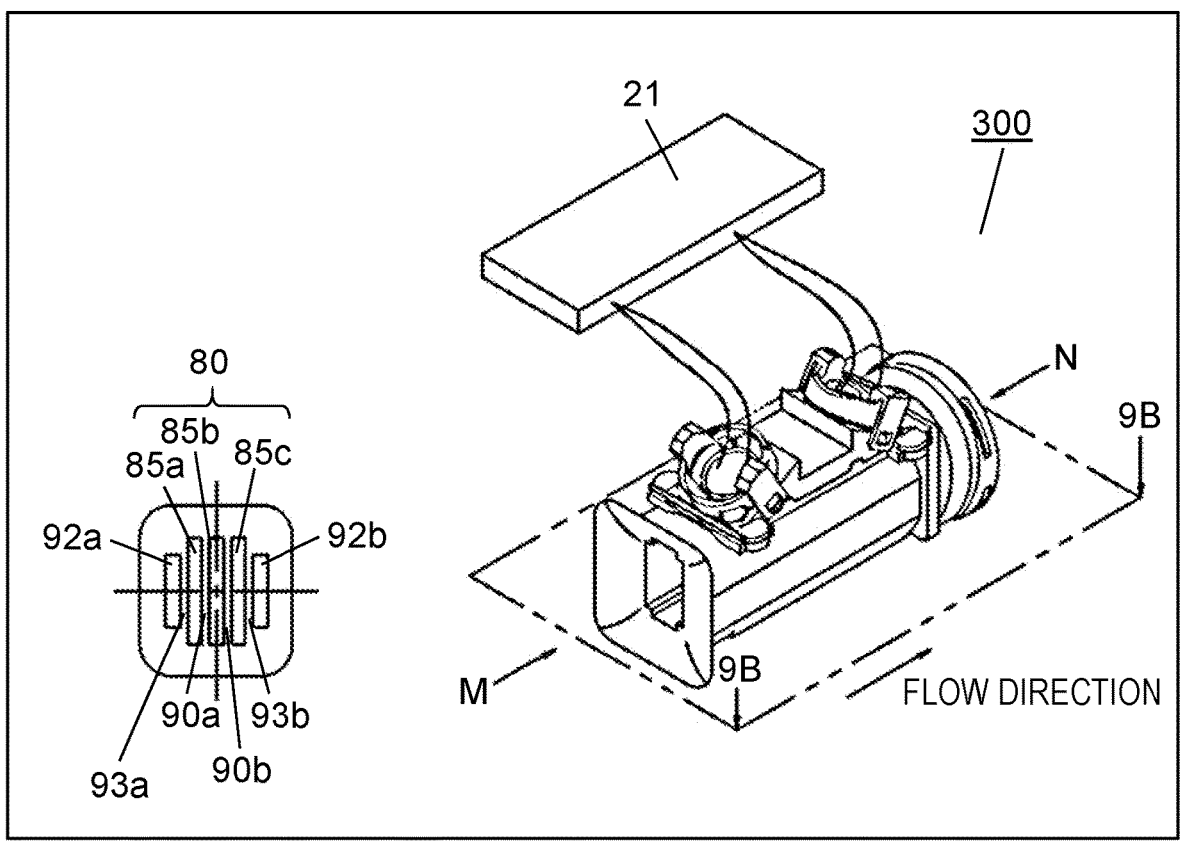
FIG. 9A is a flow path configuration diagram of an ultrasonic flowmeter according to the first modification of the present disclosure.
Figure 9B:
FIG. 9B is a cross sectional view taken along line 9B-9B of FIG. 9A.
Figure 9C:
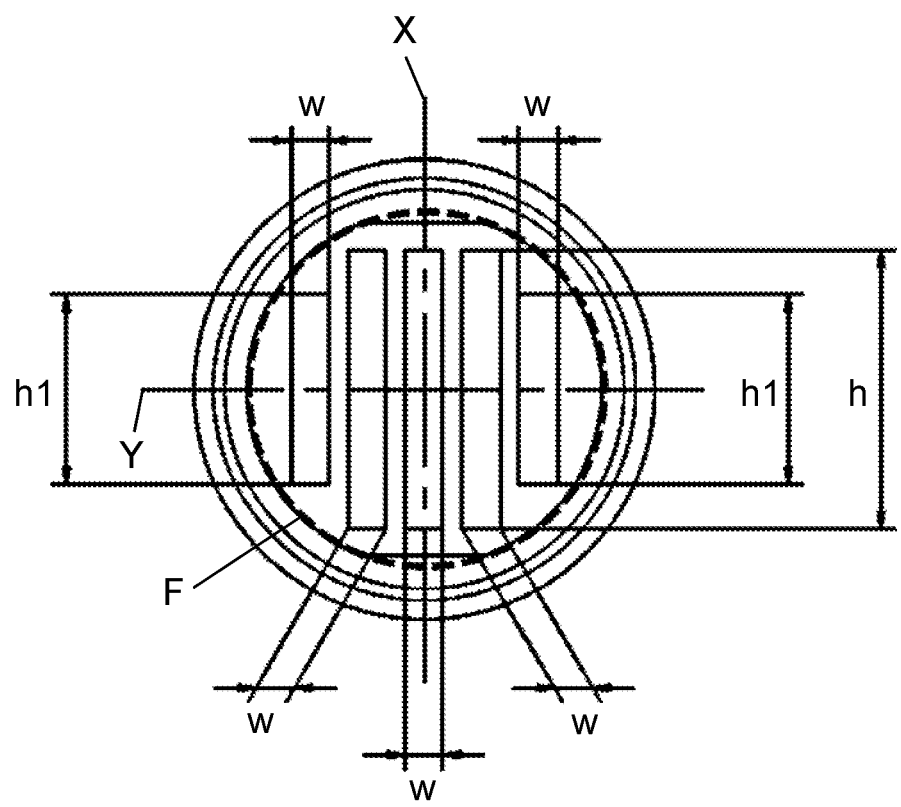
FIG. 9C is a view taken in the direction of arrow N of FIG. 9A.

FIGS. 9A to 9C are configuration diagrams of ultrasonic flowmeter 300 according to the first modification. FIG. 9B is a cross sectional view taken along line 9B-9B of FIG. 9A. FIG. 9C is a view taken in the direction of arrow N in FIG. 9A.

Measurement flow path 80 includes divided flow paths 85a, 85b, and 85c having a rectangular cross-sectional shape with width w and height h with partition plate 90a and partition plate 90b interposed between the divided flow paths. Sub flow path 92a and sub flow path 92b are added to measurement flow path 80 with sub partition plate 93a and sub partition plate 93b interposed, respectively, and are configured to have a rectangular cross-sectional shape with width w and height h1.

Figure 10:
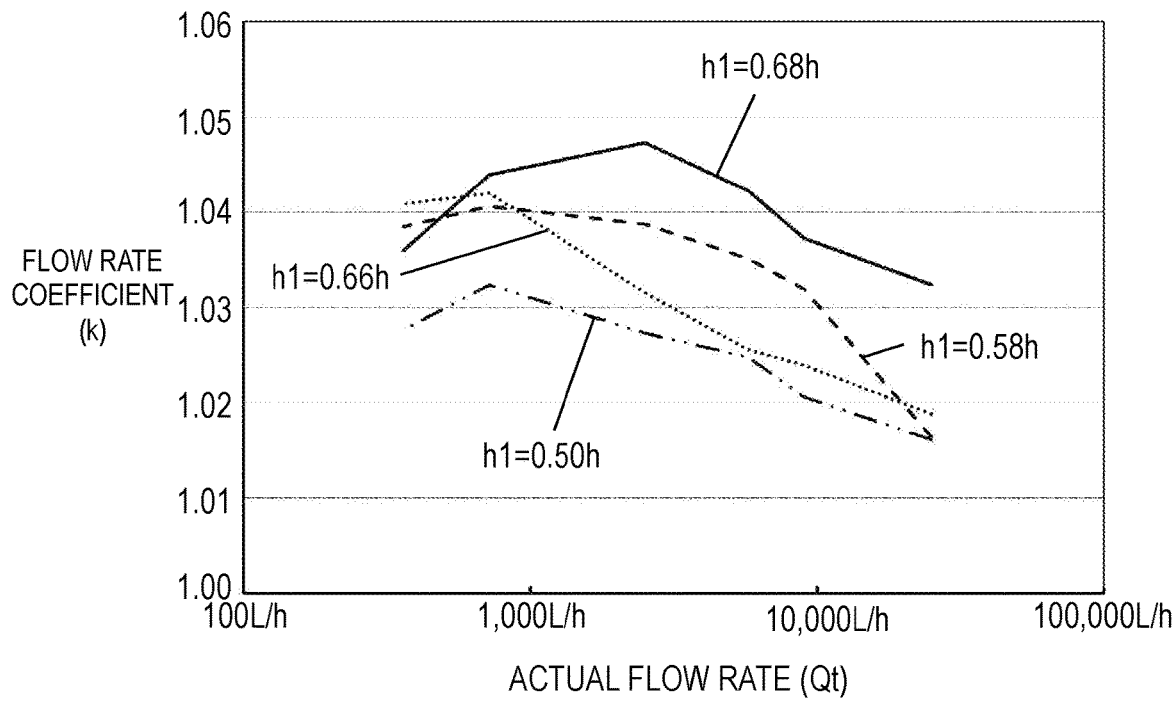
FIG. 10 is a graph illustrating the flow rate measurement result obtained by the ultrasonic flowmeter according to the first modification of the present disclosure.

FIG. 10 shows the flow rate measurement results obtained when flow path height h1 of sub flow path 92a and sub flow path 92b is changed. FIG. 10 is a graph illustrating flow rate coefficients with respect to the actual flow rates when flow path height h1 is set to 0.68h, 0.66h, 0.58h, and 0.50h. As can be seen from this graph, if the flow path widths of divided flow paths 85a, 85b, and 85c, sub flow path 92a, and sub flow path 92b of measurement flow path 80 are set to width w, there is no large difference in the results even when the flow path heights are changed to four different heights, and the measurement can be stably performed with high accuracy. Accordingly, when there is a restriction on the external size of the ultrasonic flowmeter, since the flow path height can be arbitrarily changed while the flow path widths are aligned with width w, flexible design can be performed.

(Second Modification)

The graph shown in FIG. 10 illustrates flow rate coefficient k when actual flow rate Qt falls within the range of 360 L/h to 25,000 L/h in ultrasonic flowmeter 300 according to the first modification. The solid line of the graph shown in FIG. 11 indicates flow rate coefficient k when the range of actual flow rate Qt is from 50 L/h to 25,000 L/h (inclusive) on the smaller flow rate side and flow path height h1 is 0.68 h.

Figure 11:
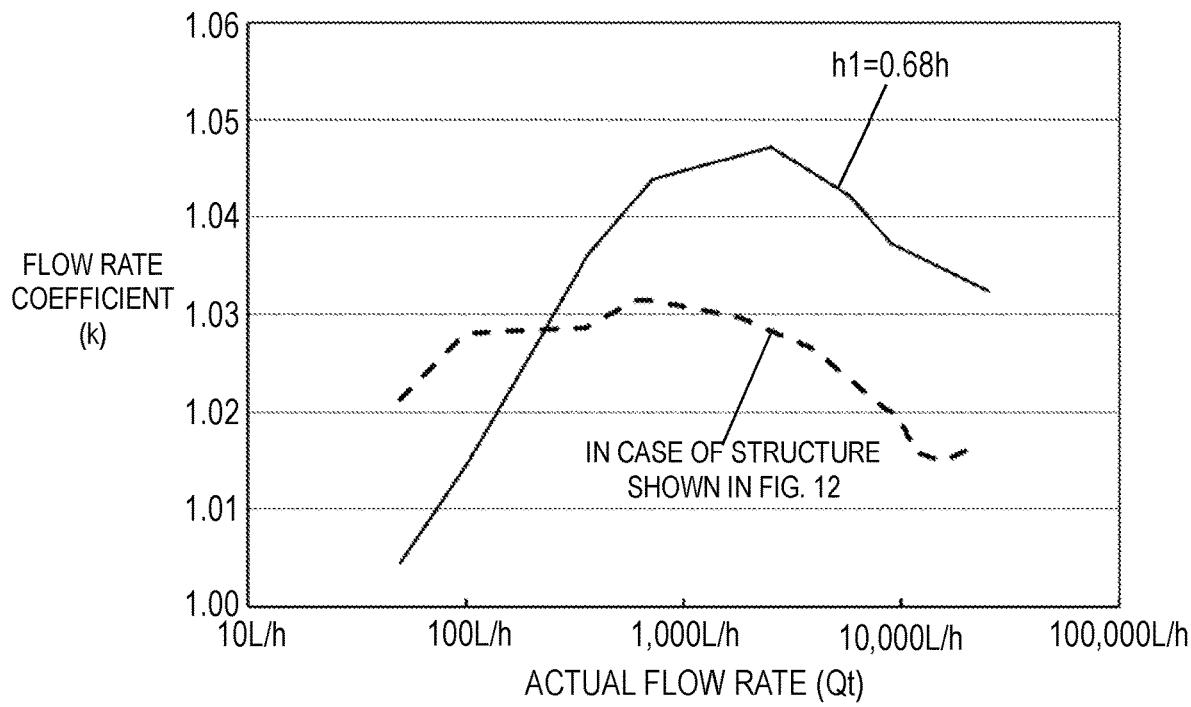
FIG. 11 is a graph illustrating the comparison between a flow rate measurement result of h1=0.68h in the ultrasonic flowmeter according to the first modification of the present disclosure and a flow rate measurement result in an ultrasonic flowmeter according to a second modification of the present disclosure.

As can be seen from FIG. 11, when flow path height h1 is 0.68h, actual flow rate Qt has a characteristic that flow rate coefficient k decreases both on the small flow rate region side and the large flow rate region side with a peak around 2,500 L/h. In particular, the flow rate tends to remarkably decrease on the small flow rate region side. This indicates that the flow in measurement flow path 80 and sub flow paths 92a, 92b is non-uniform at the time of the small flow rate, and the measurement target fluid flows more on the measurement flow path 80 side. Accordingly, in consideration of further suppressing the fluctuation range of flow rate coefficient k to improve the measurement accuracy, studies have been made to increase the flow path cross-sectional areas of sub flow paths 92a, 92b in order to make the flow more uniform at the time of a small flow rate.

Figure 12A:
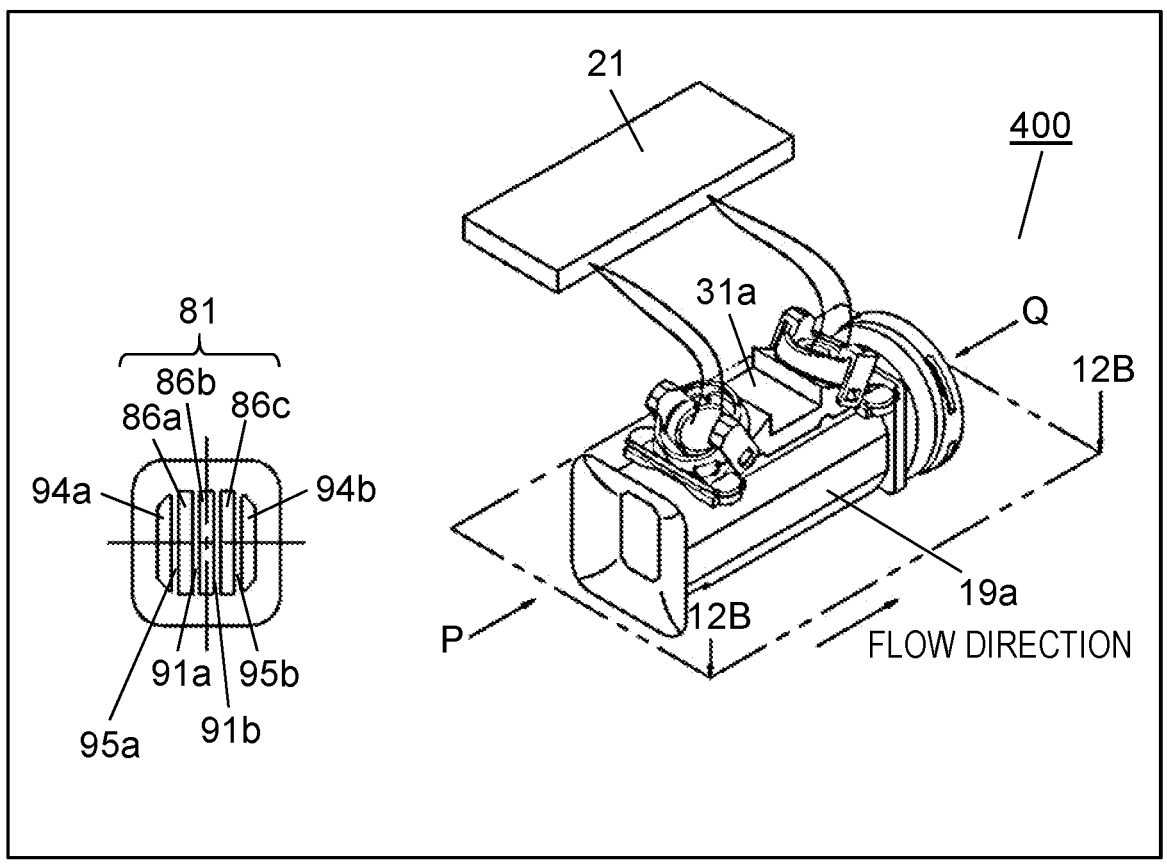
FIG. 12A is a flow path configuration diagram of the ultrasonic flowmeter according to the second modification of the present disclosure.
Figure 12B:
FIG. 12B is a cross sectional view taken along line 12B-12B of FIG. 12A.
Figure 12C:
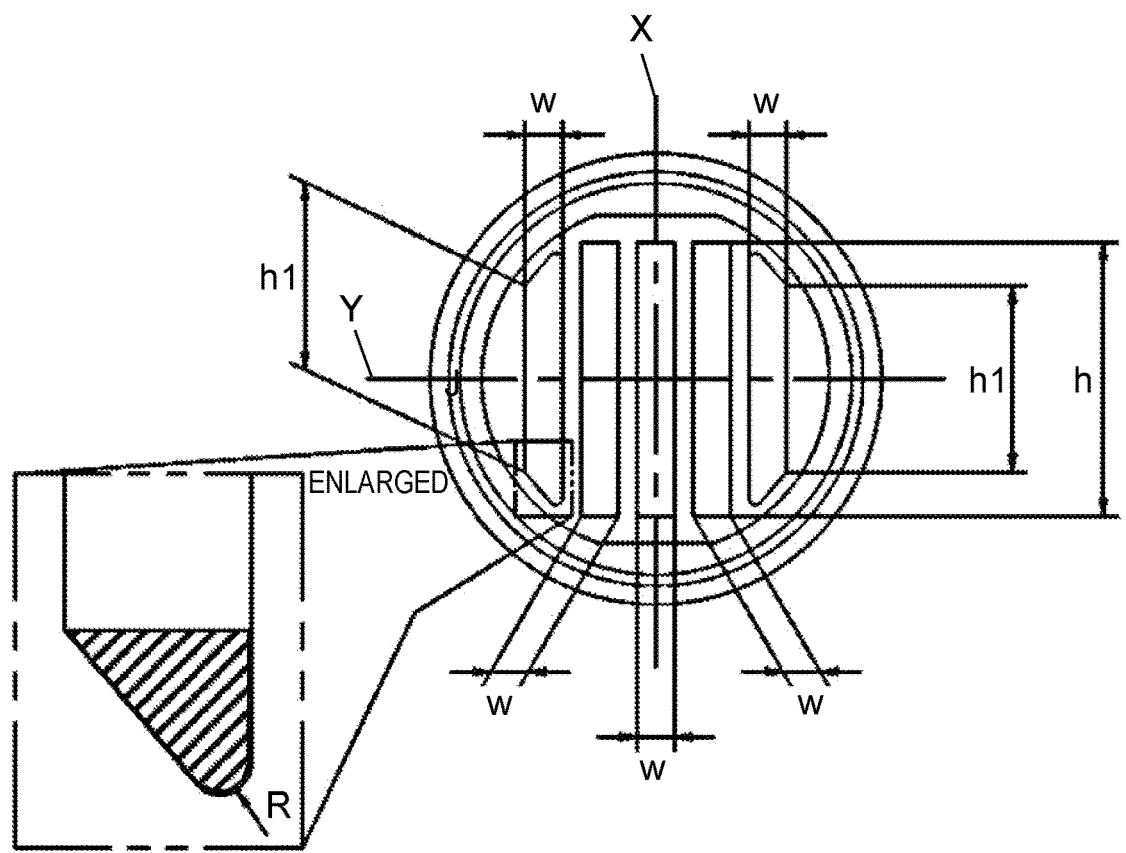
FIG. 12C is a view taken in the direction of arrow Q of FIG. 12A.
Figure 13A:
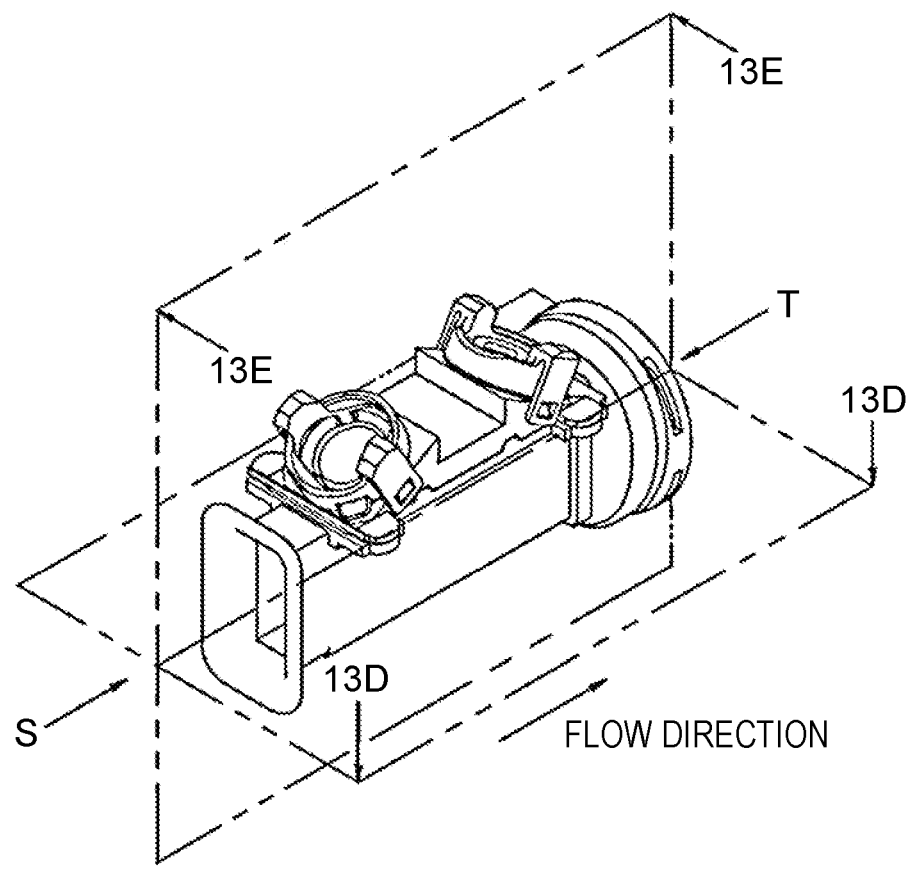
FIG. 13A is a perspective view of the conventional ultrasonic flowmeter.
Figure 13B:
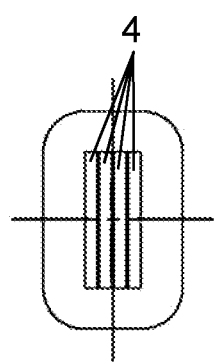
FIG. 13B is a view taken in the direction of arrow S of FIG. 13A.
Figure 13C:
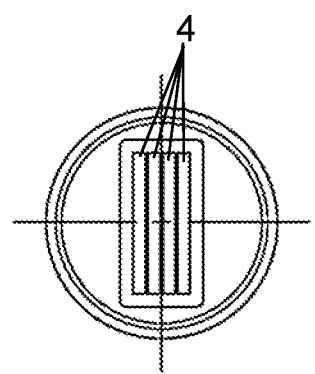
FIG. 13C is a view taken in the direction of arrow T of FIG. 13A.
Figure 13D:
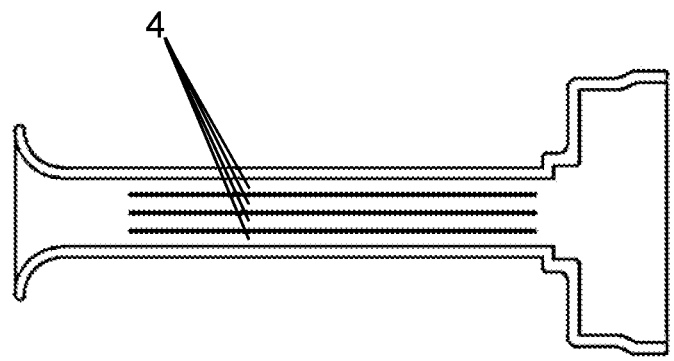
FIG. 13D is a cross sectional view taken along line 13D-13D of FIG. 13A.
Figure 13E:
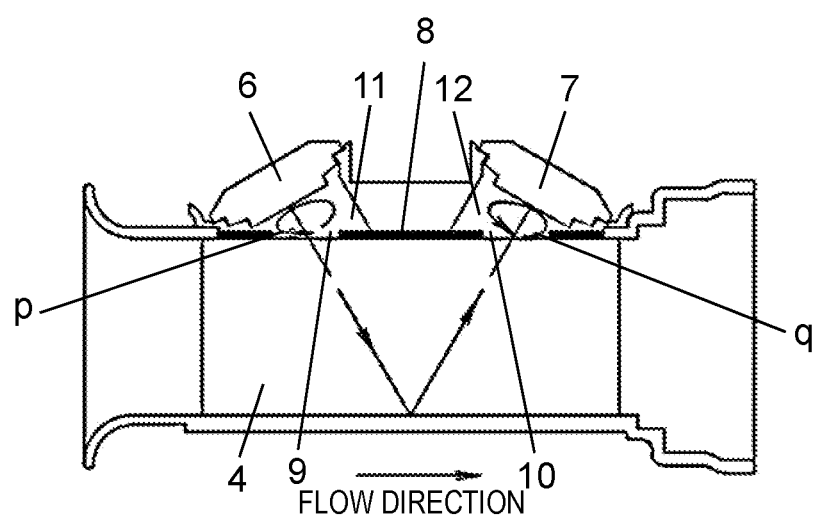
FIG. 13E is a cross sectional view taken along line 13E-13E of FIG. 13A.

FIGS. 12A to 12C are configuration diagrams of ultrasonic flowmeter 400 according to the second modification.

Referring to FIGS. 12A to 12C, a difference from the shape of ultrasonic flowmeter 300 illustrated in FIGS. 9A to 9C is that the shapes of sub flow paths 94a, 94b of ultrasonic flowmeter 400 are not rectangular but trapezoidal. That is, the flow path widths (the interval between parallel sides of the trapezoid) of sub flow paths 94a, 94b is set to same width w as the flow path widths of divided flow paths 86a, 86b, and 86c of measurement flow path 81, the flow path heights are set such that the long side is set to same height h as the flow path heights of divided flow paths 86a, 86b, and 86c and the short side is set to height h1 shorter than height h, and the sides corresponding to the legs of the trapezoid are formed obliquely along the circle including divided flow paths 86a, 86b, and 86c. Therefore, the flow path cross-sectional areas of sub flow paths 94a, 94b according to the present modification can be made larger than those of the rectangular sub flow paths shown in FIGS. 9A to 9C. As compared with the total flow path cross-sectional area in ultrasonic flowmeter 300 illustrated in FIGS. 9A to 9C, the total flow path cross-sectional area in ultrasonic flowmeter 400 is increased by the areas of the four portions having the substantially triangular shapes, each indicated by the hatched lines in the enlarged view of FIG. 12C, each corresponding to one of the upper and lower end portions of sub flow paths 94a, 94b.

In addition, a difference from the structure shown in FIGS. 3A to 3C is that flow path body 19, partition plates 20a, 20b, and sub partition plates 23a, 23b shown in FIGS. 3A to 3C are integrally molded using the same material (for example, a resin) in ultrasonic flowmeter 400 shown in FIGS. 12A to 12C. Ultrasonic flowmeter 400 may be integrally molded using the same material including ultrasonic transducer fixing body 31 illustrated in FIG. 4.

Referring to the enlarged view shown in FIG. 12C, which is the view taken in the direction of arrow Q in FIG. 12A, the added corners having the substantially triangular shape indicated by the hatching each have an appropriate substantially R shape. For example, in the case of integrally molding flow path body 19, partition plates 91a, 91b, and sub partition plates 95a, 95b with a resin, it can be expected that the mold release resistance can be reduced.

The broken line in FIG. 11 indicates the flow rate measurement result obtained by ultrasonic flowmeter 400 configured as described above when, in particular, h1=0.68 is set. As can be seen from the graph of FIG. 11, as compared with the solid line indicating the result obtained by ultrasonic flowmeter 300 illustrated in FIGS. 9A to 9C, the fluctuation range of flow rate coefficient k is suppressed (approximately 4% to approximately 1%) particularly on the small flow rate side where actual flow rate Qt is 50 L/h to 1,000 L/h (inclusive). That is, the measurement accuracy is improved. This may be because a more uniform flow was able to be implemented in measurement flow path 81 and sub flow paths 94a, 94b at the time of a small flow rate due to an increase in the flow path cross-sectional areas of sub flow paths 94a, 94b.

Assume that ultrasonic flowmeter 400 shown in FIGS. 12A to 12C is integrally formed, including ultrasonic transducer fixing body 31a, by resin molding using the same material. In this case, in the configuration as shown in FIGS. 12A to 12C, the thickness of the resin becomes thick at the portion where flow path body 19a and ultrasonic transducer fixing body 31a are joined to each other. However, since the substantially triangular flow path cross-section increasing portion is provided on the upper side of each of sub flow paths 94a, 94b, the thickness of the resin becomes more uniform, so that it can be expected to implement resin molding with higher dimensional accuracy.

Accordingly, when there is a restriction on the external size of the ultrasonic flowmeter, it is basically considered that the cross-sectional shape of each sub flow path is formed into a rectangular cross-section by arbitrarily changing the flow path height upon aligning the flow path widths to width w. However, in order to implement more uniform flow and highly accurate measurement, sub flow paths 94a, 94b are arranged symmetrically with respect to measurement flow path 81, which is a main flow path, while the cross-sectional shapes of sub flow paths 94a, 94b each are formed into a trapezoidal cross-section upon aligning the flow path widths of sub flow paths 94a, 94b to width w of divided flow paths 86a to 86c of measurement flow path 81 and the flow path height directions are made parallel within the range of predetermined values of the heights of divided flow paths 86a to 86c of measurement flow path 81. This allows flexible design for implementing a uniform flow.

Other Exemplary Embodiments

It is apparent from the foregoing description that those skilled in the art will conceive various modifications and other exemplary embodiments on the present disclosure. It is accordingly understood that the foregoing description is merely interpreted as being illustrative and is given for the purpose of teaching those skilled in the art the best mode for carrying out the present disclosure. It is therefore possible to substantially change the details of the structure and function of the present disclosure without departing from the spirit of the present disclosure.

As described above, the first disclosure includes a fluid flow path through which a measurement target fluid flows and a pair of ultrasonic transducers that are disposed upstream and downstream of the upper portion of the fluid flow path and can transmit and receive ultrasonic signals. The first disclosure further includes a flow rate calculator that calculates a flow velocity or flow rate of a measurement target fluid based on a propagation time from when the ultrasonic signal transmitted from one of the pair of ultrasonic transducers propagates through the measurement target fluid to when the ultrasonic signal is received by the other of the pair of ultrasonic transducers. The fluid flow path includes a main flow path including a plurality of divided flow paths obtained by dividing a flow path having a rectangular cross-section by the same width, and a sub flow path including an added flow path having a rectangular cross-section having the same width as that of the divided flow path and having a height lower than that of the divided flow path. Furthermore, the flow rate calculator is an ultrasonic flowmeter that calculates the flow rate of the measurement target fluid flowing through the fluid flow path from the flow velocity or flow rate of the measurement target fluid obtained based on the propagation time.

This configuration can implement highly accurate measurement of even a measurement target fluid with a large flow rate even by using the ultrasonic flowmeter whose external size is relatively compact.

The second disclosure is particularly characterized in that the ultrasonic signal transmitted from the ultrasonic transducer in the first disclosure propagates through the measurement target fluid flowing in the main flow path.

This configuration can increase the propagation distance of the ultrasonic signal more than when measurement is performed through a sub flow path, thus improving the measurement accuracy.

According to the third disclosure, particularly in the first disclosure, the sub flow paths are disposed symmetrically with respect to the main flow path.

With this configuration, since the sub flow paths and the measurement flow path have symmetrical shapes with respect to the flow direction of the measurement target fluid, a more uniform flow can be implemented, and highly accurate measurement can be implemented.

According to the fourth disclosure, particularly in the second disclosure, the sub flow paths are disposed symmetrically with respect to the main flow path.

With this configuration, since the sub flow paths and the measurement flow path have symmetrical shapes with respect to the flow direction of the measurement target fluid, a more uniform flow can be implemented, and highly accurate measurement can be implemented.

According to the fifth disclosure, particularly in any one of the first to fourth disclosures, the sub flow paths are disposed within the smallest circle including the flow passage cross-section of the main flow path.

According to the sixth disclosure, particularly in any one of the first to fourth disclosures, the added flow path has a trapezoidal cross-section.

According to the seventh disclosure, particularly in the fifth disclosure, the added flow path has a trapezoidal cross-section.

INDUSTRIAL APPLICABILITY

In the present disclosure, the flow path width of each flow path of each sub flow path added to the measurement flow path including the pair of ultrasonic transducers that can transmit and receive ultrasonic signals in a case in which a measurement target fluid with a larger flow rate is measured is set to be equal to the flow path width of each flow path of the measurement flow path. With this configuration, it is possible to provide an ultrasonic flowmeter that can implement highly accurate measurement while having a relatively compact outer shape.

REFERENCE MARKS IN THE DRAWINGS 1, 100, 200, 300, 400 ultrasonic flowmeter
4, 80, 81 measurement flow path (main flow path)
5a, 5b, 5c, 5d, 85a, 85b, 85c, 86a, 86b, 86c divided flow path
6 first ultrasonic transducer (ultrasonic transducer)
7 second ultrasonic transducer (ultrasonic transducer)
21 flow rate calculator
22a, 22b, 92a, 92b, 94a, 94b sub flow path
24a, 24b, 24c, 24d added flow path

The invention claimed is:
1. An ultrasonic flowmeter comprising:
a fluid flow path through which a measurement target fluid flows;
a pair of ultrasonic transducers disposed upstream and downstream of an upper portion of the fluid flow path and configured to transmit and receive an ultrasonic signal; and a flow rate calculator configured to calculate a flow velocity or flow rate of the measurement target fluid based on a propagation time from when the ultrasonic signal transmitted from one of the pair of ultrasonic transducers propagates through the measurement target fluid to when the ultrasonic signal is received by the other of the pair of ultrasonic transducers, wherein the fluid flow path includes:

- a main flow path including a plurality of divided flow paths obtained by dividing a flow path having a rectangular cross-section having a width and a height perpendicular to a flow direction of the measurement target fluid, the widths of the plurality of divided flow paths being same as each other; and
- a sub flow path including an added flow path having a rectangular cross-section having a width and a height perpendicular to the flow direction of the measurement target fluid, the width of the added flow path being the same as the width of the divided flow path, the height of the added flow path being lower than the height of the divided flow path, and the flow rate calculator calculates a flow rate of the measurement target fluid flowing through the fluid flow path from the flow velocity or flow rate of the measurement target fluid obtained based on the propagation time.

2. The ultrasonic flowmeter according to claim 1, wherein the ultrasonic signal transmitted from the one of the pair of ultrasonic transducers propagates through the measurement target fluid flowing in the main flow path.

3. The ultrasonic flowmeter according to claim 1, wherein the sub flow paths each being the sub flow path are disposed so as to be symmetric with respect to the main flow path when viewed in the flow direction of the measurement target fluid.

4. The ultrasonic flowmeter according to claim 2, wherein the sub flow paths are each being the sub flow path disposed so as to be symmetric with respect to the main flow path, when viewed in the flow direction of the measurement target fluid.

5. The ultrasonic flowmeter according to claim 1, wherein the sub flow paths each being the sub flow path are disposed within a smallest circle including a flow path cross-section of the main flow path.

6. The ultrasonic flowmeter according to any claim 1, wherein the added flow path has a trapezoidal cross-section.

7. The ultrasonic flowmeter according to claim 5, wherein the added flow path has a trapezoidal cross-section.

* * * * *